(12) United States Patent
Posthuma

(10) Patent No.: US 7,727,758 B1
(45) Date of Patent: Jun. 1, 2010

(54) EXTRACTION AND BREWING MACHINE

(76) Inventor: Robert Posthuma, N2210 Brothertown Beach, Chilton, WI (US) 53014

( * ) Notice: Subject to any disclaimer, the term of this patent is extended or adjusted under 35 U.S.C. 154(b) by 1112 days.

(21) Appl. No.: 11/377,845

(22) Filed: Mar. 16, 2006

(51) Int. Cl.
*C12M 1/00* (2006.01)
*C12M 3/00* (2006.01)
*C12M 1/09* (2006.01)

(52) U.S. Cl. .............. 435/289.1; 435/290.1; 435/296.1
(58) Field of Classification Search .............. 435/289.1, 435/290.1, 296.1
See application file for complete search history.

(56) References Cited

U.S. PATENT DOCUMENTS

| | | | | |
|---|---|---|---|---|
| 5,240,597 | A | * | 8/1993 | Ueda ........................... 210/149 |
| 5,597,732 | A | * | 1/1997 | Bryan-Brown ........... 435/290.4 |
| 2002/0164781 | A1 | * | 11/2002 | Alms et al. .............. 435/290.1 |
| 2004/0096963 | A1 | * | 5/2004 | Hahn et al. .............. 435/296.1 |

OTHER PUBLICATIONS

North Country Organics, Compost Tea Brewers, web site print out from www.norganics.com/tea.html viewed on Feb. 13, 2006 (2 pages), accompanied by Bobolator manual.pdf (2 pages).
Keep It Simple, Inc., web site printout of www.simplici-tea.com/product_instructions.htm, as viewed on Feb. 13, 2006 (3 pages).

* cited by examiner

*Primary Examiner*—Walter D Griffin
*Assistant Examiner*—Lydia Edwards
(74) *Attorney, Agent, or Firm*—Brannen Law Office, LLC

(57) ABSTRACT

The present invention relates to an extraction and brewing machine having a tank, a fan assembly, a base aerator, an extractor head, and an extraction assembly. The extraction assembly has a container for being submerged in liquid held within the tank, and an extraction aerator. The container is comprised of a dome and a filter. The dome defines an interior region for vigorous mixing of air, compost and water. The filter can be a mesh bag. The extraction aerator can have openings near the bottom of the bag. The flow of air though the filter causes a current of liquid, air and microorganisms to exit the chamber. The base aerator aerates all the liquid in the tank. The microorganisms in the tea continue to grow and multiply in the tank after extraction from the chamber, and no particles pass the filter that could jam a spray nozzle.

20 Claims, 7 Drawing Sheets

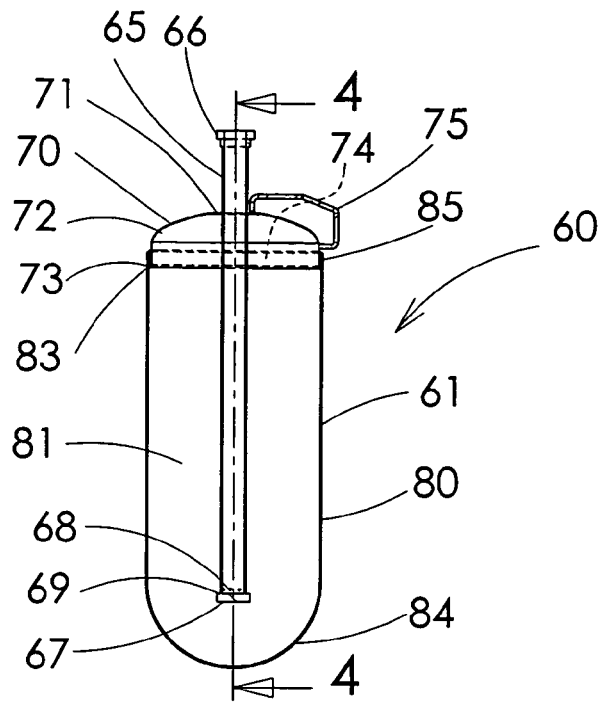
FIG 3
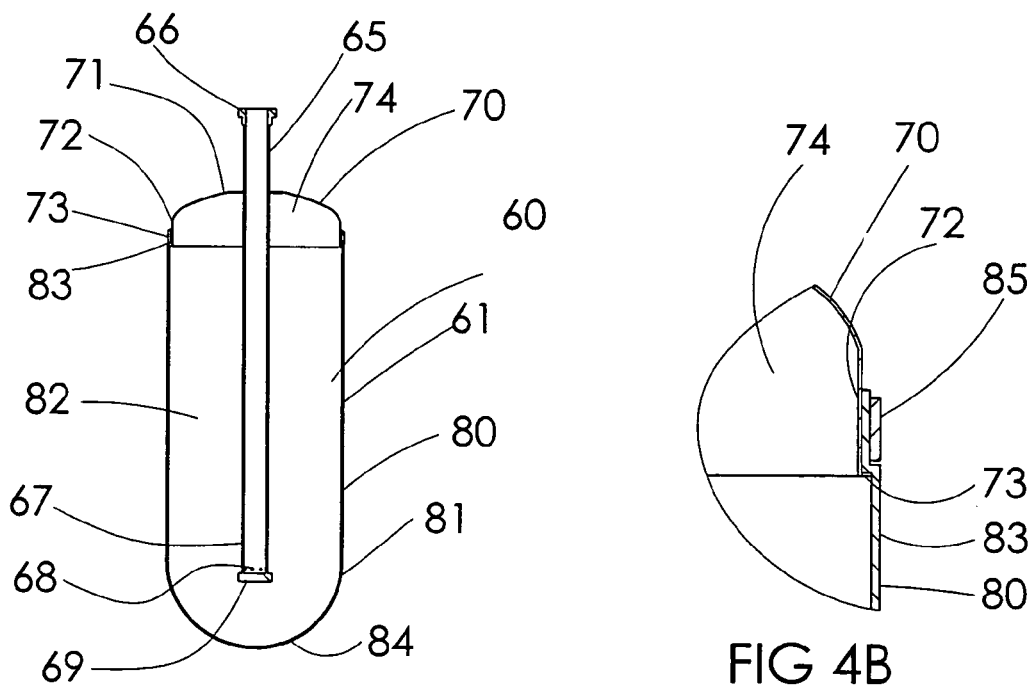
FIG 4A
FIG 4B

EXTRACTION AND BREWING MACHINE

BACKGROUND OF THE INVENTION

1. Field of the Invention

The present invention relates to an extraction and brewing machine, and more particularly to a machine having an aeration container where particles or microorganisms can be extracted through a filter into a larger aeration tank.

2. Description of the Related Art

The use of fertilizers is well understood to aid in the growth of plants. Chemical fertilizers in particular are extensively used today. Chemical fertilizers are used residentially in applications such as residential lawns, flower gardens and vegetable gardens. Examples of commercial use of chemical fertilizers include golf courses and farms. While chemical fertilizers may work well for their intended purposes, there are some drawbacks associated with their applications. Overuse of chemical fertilizers can be harmful to exposed areas, as evidenced by patches of "burnt" lawns. Further, children and pets should stay clear of treated areas until after the chemical fertilizer has been worked into the soil. This commonly occurs during a rainfall. Runoff of excess chemical fertilizers can further cause damage the overall ecosystem.

Organic compost has long been known to be an excellent fertilizer and soil conditioner. When properly tended to, compost comprises many beneficial microbial organisms, or microorganisms. Among the many beneficial microorganisms are bacteria, fungi, protozoa and nematodes. Benefits of using organic compost include aiding in the natural biological process in soil to make nutrients and water available to root systems of plants. Further, the microorganisms in the organic compost can help protect plants from disease causing organisms, improve nutrient retention and water retention of the soil, reduce or eliminate harmful pesticides, and decompose harmful toxins. Use of organic compost to cover widespread areas is impractical, as the amount of area that can be treated with the compost is limited based on the amount of compost. The economics of obtaining and spreading large quantities of compost effectively further limits its practicality.

Many attempts have been made to extract and/or grow the beneficial microorganisms found in the compost. The process generally comprises the steps of extracting beneficial microorganisms from compost and/or aerobically growing the microorganisms in water or other liquid. A solution made of water and microorganisms is called compost tea, or simply tea. The process of growing the tea is called tea brewing. The tea can be applied to the soil in place of and/or in addition to chemical fertilizers. A goal of applying microorganisms to the soil is to enhance the soil, not necessarily to replace the need for chemical fertilizers. In this regard, the microorganisms are useful in making the chemical nutrients available to the plants. One common method of application of the tea utilizes spray nozzles to mist the tea over a selected area. Compost having certain characteristics and quantities of organisms can be used to brew tea with specific characteristics or quantities of specified microorganisms. A benefit of using tea is that the beneficial microorganisms can be applied to a large area. Another benefit of using compost tea is that the tea is not harmful to children and pets, and that use of the treated area can resume quickly without waiting for a rainfall.

Some extraction machines utilize mechanical mixers used to mix the compost in water. While the mechanical mixers are efficient at mixing the compost and water, the mixers also can harm or destroy the microorganisms in the compost. Further, the more vigorous the mixing, the greater the potential damage to the microorganisms. Still further, in a non-aerated mechanically mixed environment, the oxygen demands of the microorganisms can quickly deplete the available dissolved oxygen in the liquid. Non-beneficial or harmful microorganisms could then proliferate under the anaerobic conditions.

Sometimes the compost is mixed with the tea in a single large aeration tank. In such a situation, the tea must be strained or filtered before use to prevent the tea from jamming the nozzles of a sprayer machine. One drawback of filtering the tea after it is brewed is that filtering the tea may filter out many or most of the beneficial microorganisms.

A system exists comprising an aerated tank with a filter supported within the tank. One such system is sold under the name Bobolator. In this system, the microorganisms that escape through the filter can grow in the tea. However, the filter used in this system is partially open directly to the atmosphere. A large percent of the air exiting the filter therefore passes directly to the atmosphere without first passing through the filter into the larger tank. The air that passes directly to the atmosphere does little to aid in the extraction of microorganisms through the filter. Accordingly, only a limited quantity of microorganisms passes through the filter and into the tank.

Other systems have been designed having a bag filled with compost that is submergible in a tank. One such system is sold under the name Simplici-tea. In this system, the bag is free to move anywhere in the tank. Further, there is no active process for specifically aerating the bag or drawing air through the bag. Therefore a limited amount of the air may pass through the bag, and the extraction rate can be less than optimal.

Many systems use plastic components, which can be easily scratched. It is difficult to clean scratched plastic components, and microorganisms can remain in the scratches. Anaerobic conditions can develop in the scratches, and non-beneficial or harmful microorganisms can proliferate under anaerobic conditions.

Thus there exists a need for an improved tea extractor and brewer that solves these and other problems.

SUMMARY OF THE INVENTION

Organic fertilizer and compost tea have many desirable attributes, especially when compared to chemical fertilizers and used in addition to chemical fertilizers. A high yield tea brewing machine is therefore desirable. The present invention relates to an extraction and brewing machine having a tank, a fan assembly, a base aerator, an extractor head, and an extraction assembly. The extraction assembly can have a container for being submerged in liquid held within the tank. The container can be comprised of a dome and a filter. The dome can define a jostling chamber comprised of the interior region of the dome bound by top and side wall. The filter can be a mesh bag depending from the dome and having openings of a predetermined size. The extraction assembly can further have an extraction aerator with openings near the bottom of the bag. During use, the compost can be vigorously jostled in the interior region of the dome. The base aerator is useful to aerate the liquid in the tank.

According to one aspect of the present invention, the tea brewer is 100% air driven. That is, air is used to jostle the compost and extract the microorganisms from the compost. Also, the base aerator is useful to aerate and mix the liquid, or brew, in the tank. One benefit of the present design is that highly aerobic conditions are provided in the tank for promoting the growth of beneficial microorganisms. Another benefit is that air jostling vigorously mixes the compost without harming the microorganisms.

According to another aspect of the present invention, the compost is vigorously jostled in a submerged container. The volume of air entering the container though the extraction aerator generally equals the volume of air exiting the container through the filter. The microorganisms in the compost are generally smaller than the holes in the filter. The flow of air though the filter causes a current of liquid, air and microorganisms to develop in a manner exiting the container. The rate of microorganism extraction is greatly improved by producing a flow, or current, of air, liquid, and microorganisms exiting the container. Water is able to flow into the container near the bottom to replace the water leaving the filter with the air.

According to a further aspect of the present invention, the container contains a region defined by the dome where vigorous jostling can take place. The dome is initially filled with air as it is submerged in the tank. Air entering the container has a tendency to raise straight up when released in the bottom of the container. The rising air in the container can enter the dome, where it can vigorously mix with compost, liquid and other air. The vigorous jostling creates a preferred environment where microorganisms can separate from the remainder of the compost. Improved separation of the microorganisms from the remainder of the compost increases the number of microorganisms that are available to be extracted from the container.

According to yet a further aspect of the present invention, the tea that is grown in the tank contains no particles that could jam common-sized spray nozzles. That is, the relatively large compost particles that could otherwise jam a common-sized spray nozzle remain in the container and are not able to pass through the filter.

According to a still further aspect of the present invention, the components can be made from hardened materials, such as stainless steel. The hardened materials are resistant to scratching and easy to clean. Clean and scratch-free surfaces do not provide conditions favorable to anaerobic growth of non-beneficial microorganisms.

According to a still further aspect of the present invention, the components are collapsible for shipping. The fan assembly, base aerator, extractor head, and extraction assembly can fit within the frame for shipping within a box.

Other advantages, benefits, and features of the present invention will become apparent to those skilled in the art upon reading the detailed description of the invention and studying the drawings.

BRIEF DESCRIPTION OF THE DRAWINGS

FIG. 3 is a side view of a preferred embodiment of the extraction assembly of the present invention.

FIG. 4A is a sectional view taken along line 4-4 in FIG. 3.

FIG. 4B is a close up view of the band clamp securing the filter to the dome above the lip of the dome.

DETAILED DESCRIPTION OF THE PREFERRED EMBODIMENTS

Figure 1:
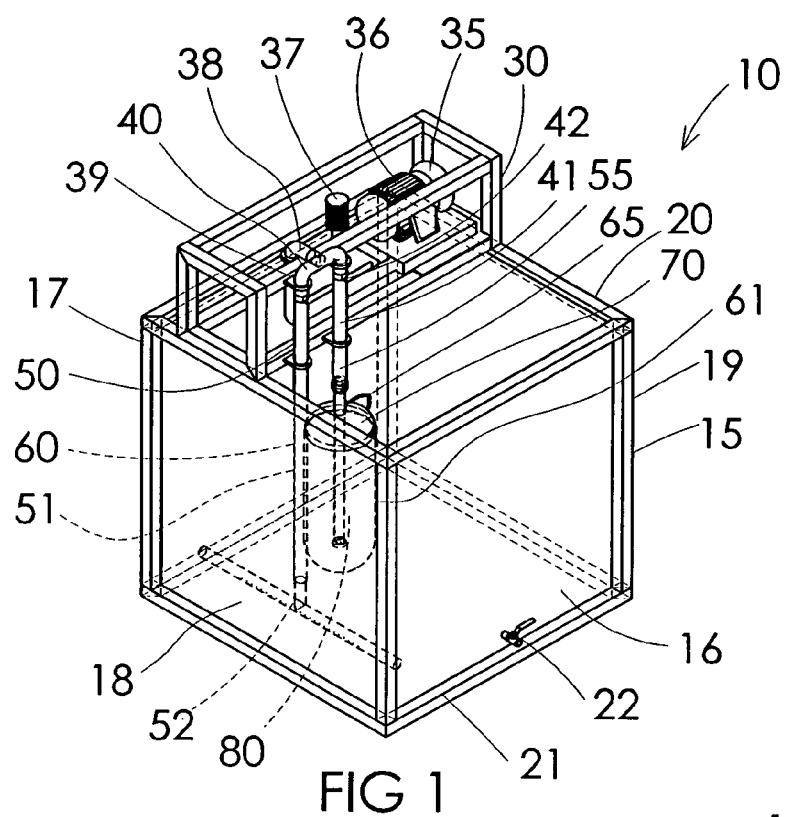
FIG. 1 is a perspective view of a preferred embodiment of the present invention.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention utilizes a liquid 1 as a medium for allowing microorganisms to grow. One preferred liquid 1 is water. However, other liquids could alternatively be used without departing from the broad aspects of the present invention. Gas 2 containing oxygen is aerated through the liquid 1, as described below. It has been found that atmospheric air contains sufficient oxygen to adequately aerate the liquid 1. However, other gaseous mixtures including oxygen can be used without departing from the broad aspects of the present invention. Compost 3 containing large particles 4 and smaller particles such as microbes, or microorganisms 5, is a preferred substance from which microorganisms 5 can be extracted. It is well understood how to make quality compost.

According to one preferred embodiment of the present invention, an extraction and aeration apparatus 10 is provided. The apparatus 10 has a tank 15, a frame 30, a fan assembly 35, a base aerator 50, an extractor head 55, and an extraction assembly 60. These components are described in detail below.

Figure 2:
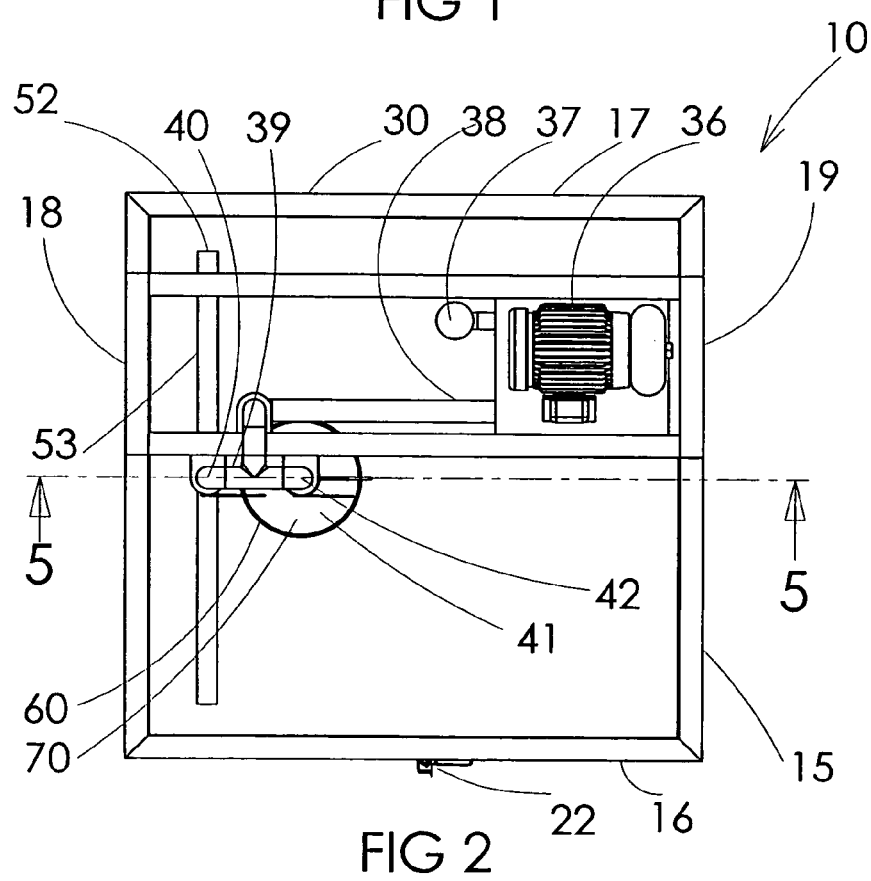
FIG. 2 is a top view of the preferred embodiment shown in FIG. 1.
Figures 5, 6, 7:
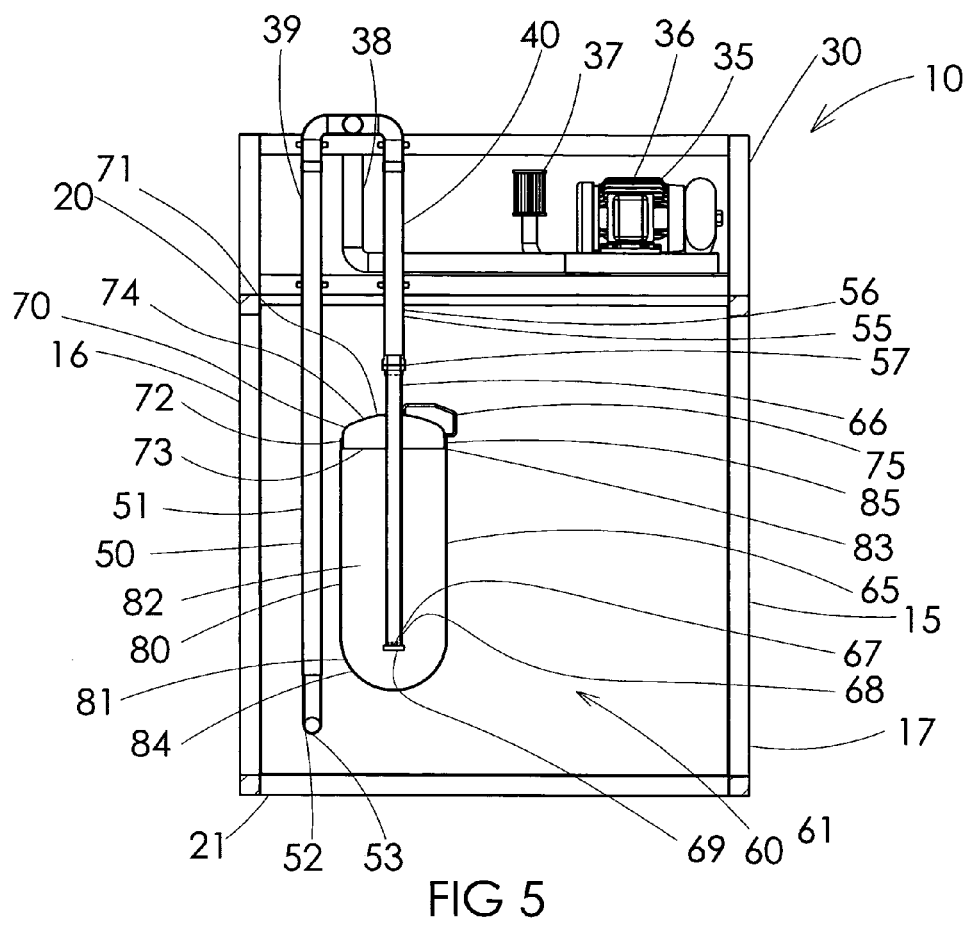
FIG. 5 is a sectional view taken along line 5-5 in FIG. 2.
FIG. 6 is a close-up view of a section of the base aerator shown in FIG. 1.
FIG. 7 is a close up view of the bottom end of the extraction aerator in the extraction assembly shown in FIG. 1.
Figure 9:
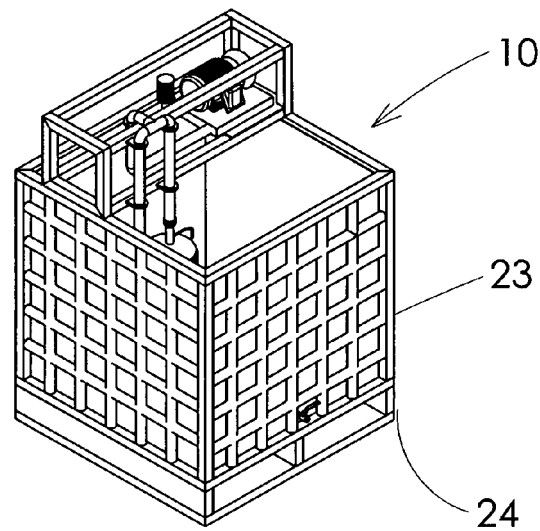
FIG. 9 is a perspective view of an alternative preferred embodiment of the present invention.

The tank 15, as best shown in FIGS. 1, 2 and 5, has a first side (front) 16 and an opposed second side (rear) 17, and has sides 18 and 19 between the front 16 and rear 17. The tank 15 also has a top 20 and a bottom 21. The sides 16, 17, 18 and 19, and the top 20 and bottom 21 preferably define a generally box shaped tank, with interior dimensions approximately 40 inches wide, by 46 inches deep, by 42 inches tall. However, it is understood that the shape and particular dimensions of the tank 15 can vary without departing from the broad aspects of the present invention. It is preferable that the intersections of the side walls and the top and bottom, respectively, are radiused to eliminate havens where harmful microorganisms can flourish. The tank 15 can be made of plastic material, metal, or any other material suitable for non-pressurized tanks. In the preferred embodiment, an exit orifice 22 is located on the front 16 of the tank 15 near the bottom 21. The orifice 22 is used to drain the contents of the tank 15, and accordingly has a valve used to selectively open and close the orifice. Optionally, the tank can be framed with a metal cage 23, and can have a pallet-type base 24 enabling the tank 15 to be moved with a forklift. The metal cage 23 and base 24 are shown in FIG. 9. The preferred dimensions of tank 15 are sufficient to accommodate approximately 250 gallons of liquid 1. A tank with this volume has been found suitable for operation and transport in the bed of a full sized pickup truck.

The frame 30, shown in FIGS. 1 and 2, can be located on the top 20 of the tank 15. The frame 30 can preferably be made of stainless steel. The frame 30 preferably has a length equal to the width of the tank 15. In the illustrated embodiment, the frame 30 is offset from the rear 17 of the tank.

The fan assembly 35 is preferably housed within the frame 30. As seen in FIGS. 1 and 2, the fan assembly 35 preferably has a fan 36, or blower, and an air filter 37. The fan 36 is preferably capable of moving 30 cubic feet per minute, or cfm. A tube 38 is connected to the fan 36. The tube 38 splits to two tubes 39 and 41. Tube 39 can be selectively opened and closed with valve 40. Tube 41 can be selectively opened and closed with valve 42. The tubes 39 and 41 are preferably made of steel. However, rigid plastic tubes could also be used without departing from the broad aspects of the present invention. Tubes 38, 39, and 41 preferably have a diameter of approximately 1.5 inches. While the tubes 38, 39 and 41 are shown to be generally circular in shape, it is understood that the tubes could also be other shapes, such as square.

The base aerator 50, as shown in FIG. 5, has a depth tube 51 and a lateral base tube 52. The depth tube 51 is preferably substantially vertical, and has a preferred diameter of approximately 1.5 inches, and is preferably located near the side 18 of the tank 15. The depth tube 51 can be made disconnectable to allow for shipping and storage. The tube is preferably located equidistant between the front 16 and rear 17 of the tank 15. The lateral base tube 52 is preferably substantially horizontal and located near the bottom 21 of the tank 15 near side 18. The base tube 52 preferably has ends that are located equidistant from lateral tube 51. Base tube 52 preferably has a diameter of approximately 1.5 inches. Several openings 53 are located through the base tube 52 to allow the air to escape into the tank 15. The openings 53 are preferably located through the bottom of the tube 52, but can be located elsewhere around the tube without departing from the broad aspects of the present invention. A close-up cross-sectional view of a section of the preferred base aerator is shown in FIG. 6. While the base tube 52 is shown to have a generally circular shape, it is understood that is can also have other shapes. It this preferred embodiment, the base aerator 50 is integral with tube 39. Base aerator 50 preferably has an aeration rate of approximately 22 cfm. It is understood that the base aerator 50 could have a larger or smaller aeration rate without departing from the broad aspects of the present invention.

The extractor head 55 is preferably integral with tube 41. The extractor head 55, as shown in FIGS. 1 and 5, preferably comprises a generally vertical tube 56. Tube 56 has a top and a bottom. The bottom of the tube 56 preferably has a yoke 57 for removeably connecting to another tube (discussed below). The extractor head 55 preferably has a diameter of approximately 1.5 inches. It is understood that the extractor head 55 could have a different size and shape without departing from the broad aspects of the present invention.

The extraction assembly 60, as is shown in FIGS. 3-5, defines a container 61. The container 61 has a top portion and a bottom portion. In a preferred embodiment, the container 61 has a volume of four to five gallons. However, the container 61 could be larger or smaller without departing from the broad aspects of the present invention. The container 61 is sized to hold a selected amount of compost 3 or other material. The extraction assembly 60 is removeably connected to the extractor head 55. In this regard, the extraction head 55 holds the extraction assembly 60 in an intended location within the tank 15. The extraction assembly 60 generally comprises an extraction aerator 65, a dome 70 and a filter 80, each of which are described in detail below.

The extraction aerator 65 has a top 66 and a bottom 67. Openings 68 are located near the bottom 67 for allowing air to exit the extraction aerator 65 during use. The extraction aerator 65 is preferably a straight and tubular shaped and has a diameter of approximately 1.5 inches. However, it is understood that the extraction aerator could have other shapes or sizes. The extraction aerator 65 is preferably rigid, and is preferably made of stainless steel. The top 66 of the extraction aerator 65 removeably connects to yoke 57 of the extractor head 55. An end cap 69 is preferably at the bottom 67 of the extraction aerator 65. The end cap 69 can be removed from the bottom 67 to allow for cleaning of the extraction aerator 65. A close up view of the bottom 67 of the extraction aerator 65 showing the openings 68 and end cap 69 is shown in FIG. 7. Extractor aerator 65 preferably has an aeration rate of approximately 8 cfm. However, it is understood that the aeration rate could be greater or smaller without departing from the broad aspects of the present invention.

The dome 70 has a top 71 and a sidewall 72. The sidewall 72 has a top and a bottom. The top 71 and sidewall 72 have an interior surface and an exterior surface. A lip 73, as best shown in FIG. 4B, preferably surrounds the sidewall 72 at the bottom exterior surface of the sidewall. The interior of the dome 70 defines an interior region 74, or simply region. A handle 75 can optionally be connected to the outside surface of the dome. The dome is preferably made of stainless steel. In the illustrated embodiment, the extraction aerator 65 passes through the center of the dome 60. It is understood that the extraction aerator 65 could extend around the outside of the dome without departing from the broad aspects of the present invention. While the dome shape has been found to be a preferred shape, other shapes are possible.

A preferred filter 80 is a mesh bag 81. The mesh bag 81 has openings 82 preferably sized approximately 400 microns. However, the openings 82 could be between about 250 and 841 microns (20 to 60 mesh) without departing from the broad aspects of the present invention. The mesh bag 81 further has a top 83 and a bottom 84, an interior surface and an exterior surface. The bag 81 preferably has an interior capacity of approximately 4 gallons. A clamp 85 is preferably located at the top 83 of the bag 81. The clamp 85 can be a band clamp, and it is used to removeably secure the bag 81 to the dome 70 by tightening onto the exterior surface of the dome 70 above the lip 73. It is shown in FIGS. 3 and 4A that the extraction aerator 65 extends to near the bottom 84 of the bag 80, and passes through the interior of the bag. Alternatively, a rigid filter such as a wire mesh cage could be used without departing from the broad aspects of the present invention. Further alternatively, the extraction aerator could pass around the exterior of the filter 80 and have an opening at the bottom 84 of the filter. The filter 80 can be a single-use filter or a reusable filter.

Figure 8A:
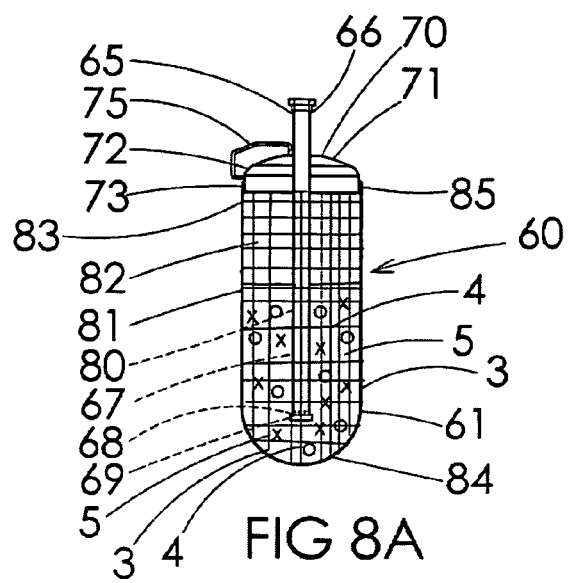
FIG. 8A is a sectional view of the extraction assembly showing a selected amount of compost in the extraction assembly.
Figure 8B:
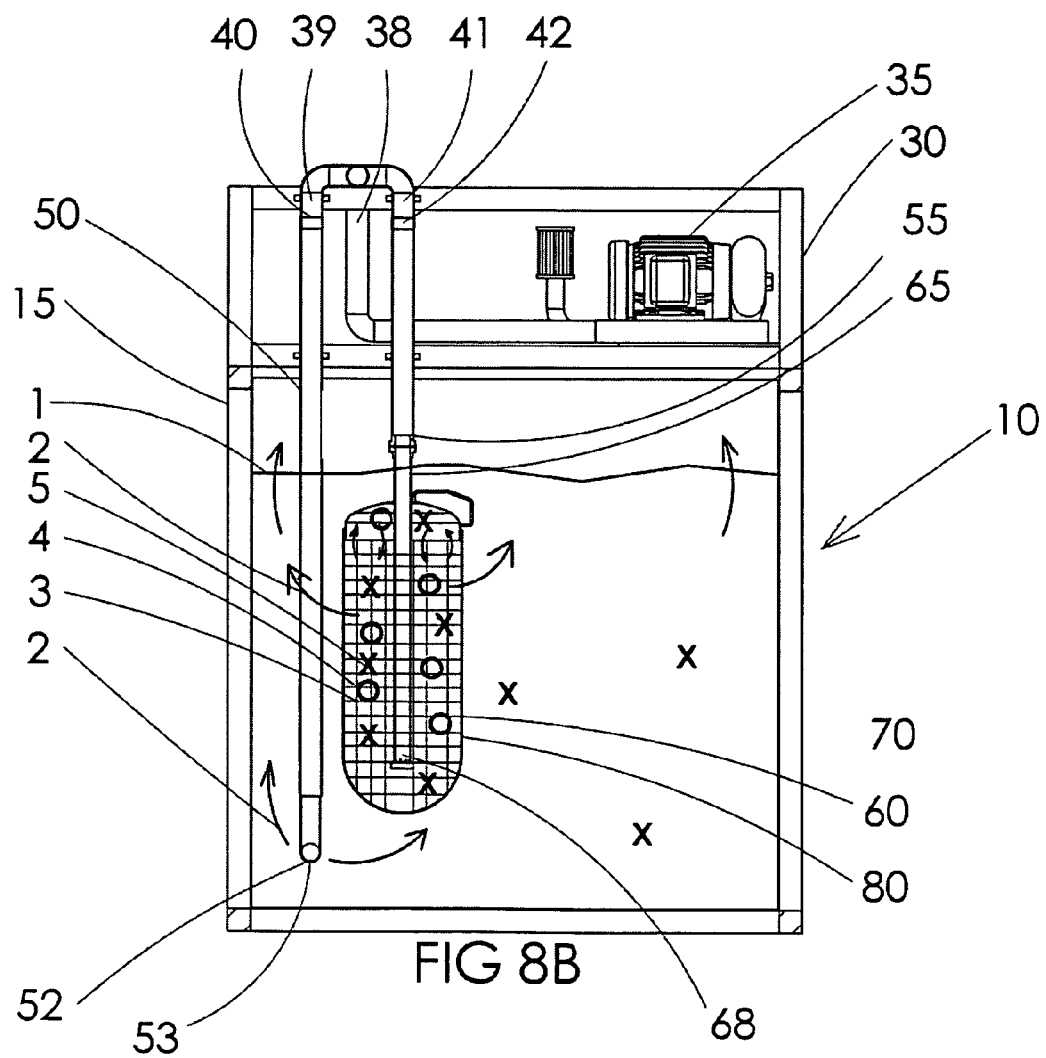
FIG. 8B is a schematic view of an embodiment of the present invention showing operation of the preferred embodiment.

Turning now to the operation of the present invention, the aeration apparatus 10 can be unpacked and assembled. In this regard, the components 35, 50, 55, and 60 can be contained within the frame 30 while being shipped. The frame 30 can be set on top of the tank 15. A selected amount of water (preferably approximately 250 gallons) can be inserted into the tank 15. A selected amount of compost (preferably approximately 2 gallons, or about 8 liters) can be placed on the inside of the filter 80. The filter 80 can then be clamped onto the dome 70 by securing the band clamp 85 onto the exterior surface of the dome 70 above the lip 73, as shown in FIG. 8A. The extraction assembly 60 can then be put in place within the tank 15, as shown in FIG. 8B. This is preferably accomplished by the user holding onto the handle 75 and connecting the top 66 of the extraction aerator 65 to the yoke 57 of the extractor head 55. Since the extraction aerator 65 and the extraction head 55 are rigid components, the extraction assembly 60 is held in its selected location within the tank 15. In the preferred location, at least the lip 73 at the bottom of the dome 70 is submerged within the liquid 1 in the tank 15. The entire dome 70 can be submerged in the liquid, as shown in FIG. 8B.

With the extraction assembly 65 secured in place within the tank 15, the blower 36 can be activated. Operation of the aeration assembly 60 is schematically shown in FIG. 8B. The blower 36 draws in filtered air 2 through the air filter 37 and moves the air 2 to tube 38. Tube 38 splits into two tubes; tube 39 for the base aerator 50 and tube 41 for the extractor head 55. Valve 40 can be opened to allow air 2 to exit the holes 53 in the lateral tube 52 of the base aerator 50 at the bottom 21 of the tank 15. Valve 42 can be opened to allow air 2 to enter the extraction aerator 65. The air 2 in the extraction aerator 65 exits into the filter 80 by exiting holes 68 near the bottom 67 of the extraction aerator 65.

Continuing with FIG. 8B, large particles 4 of the compost 3 are represented by "o", and the microorganisms 5 are represented by "x". Air 2 entering the extraction assembly 60 mixes with the compost 3 and liquid 1 in the filter 80 as the air rises through the filter. Some of the compost 3 rises with the air into the region 74 defined by the dome 70. Vigorous mixing occurs in the dome 70. Bidirectional movement of the air causes the vigorous jostling. That is, the air 2, being less dense than the liquid 1, tends to rise in the liquid. However, the dome captures the rising air and causes the air to redirect downward so that it can exit the extraction assembly 60 through the filter 80. The vigorous mixing accelerates the separation of the microorganisms 5 from the larger particles 4 in the compost 3. The greater the separation of microorganisms 5 from the larger particles 4, the more efficient the extractor can be.

Generally, approximately the same amount of air that enters the extraction assembly 60 must also exit the extraction assembly in a given amount of time. The only way for the air 2 to exit the extraction assembly 60 is through the filter 80. Air 2 leaving the filter 80 causes a current, or flow, of air 2, liquid 1 and small particles to exit the filter 80 through the holes 82 at or near the top 83 of the filter. Liquid can be drawn into the filter 80 near the bottom 84 of the filter to replenish the liquid exiting the filter 80 near the top 83. This contributes to the mixing of the liquid 1, air 2, and compost 3 in the extraction assembly 60. The natural tendency of the air 2 to continually rise in the liquid 1 causes the air to enter the region 74 of the dome 70 for vigorous bidirectional mixing.

The microorganisms 5 that are extracted from the extraction assembly 60 can aerobically grow and multiply in the aerated tank 15. Selected types and amounts of microbial food can be added to the tank 15 to aid in this growth. It is noteworthy that large particles 4 remain in the extraction assembly 60 and are incapable of passing through the filter 80. It has been found beneficial to run the extraction process for approximately 20-24 hours to achieve a solution having high numbers of microorganisms. After that point, valve 42 can be closed and the extraction assembly 60 can be removed. The extraction assembly 60 is removed by disconnecting the extraction aerator 65 from the yoke 57 of the extraction head 55 and using the handle 75 to lift the extraction assembly 60 from the tank 15. The tea can be kept in the tank for approximately four days so long as the fan 36 stays on and valve 40 stays open. The tea can be drained from the tank 15 through orifice 22.

Figure 10:
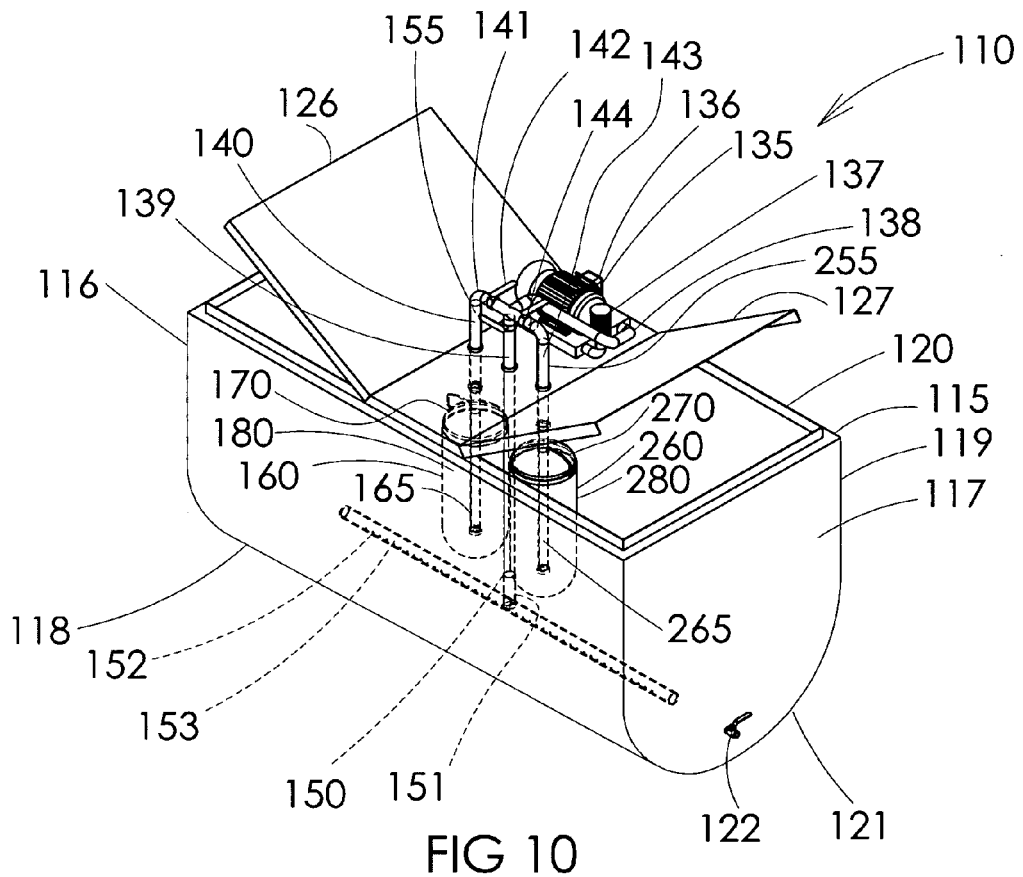
FIG. 10 is a perspective view of an alternative preferred embodiment of the present invention.
Figure 11:
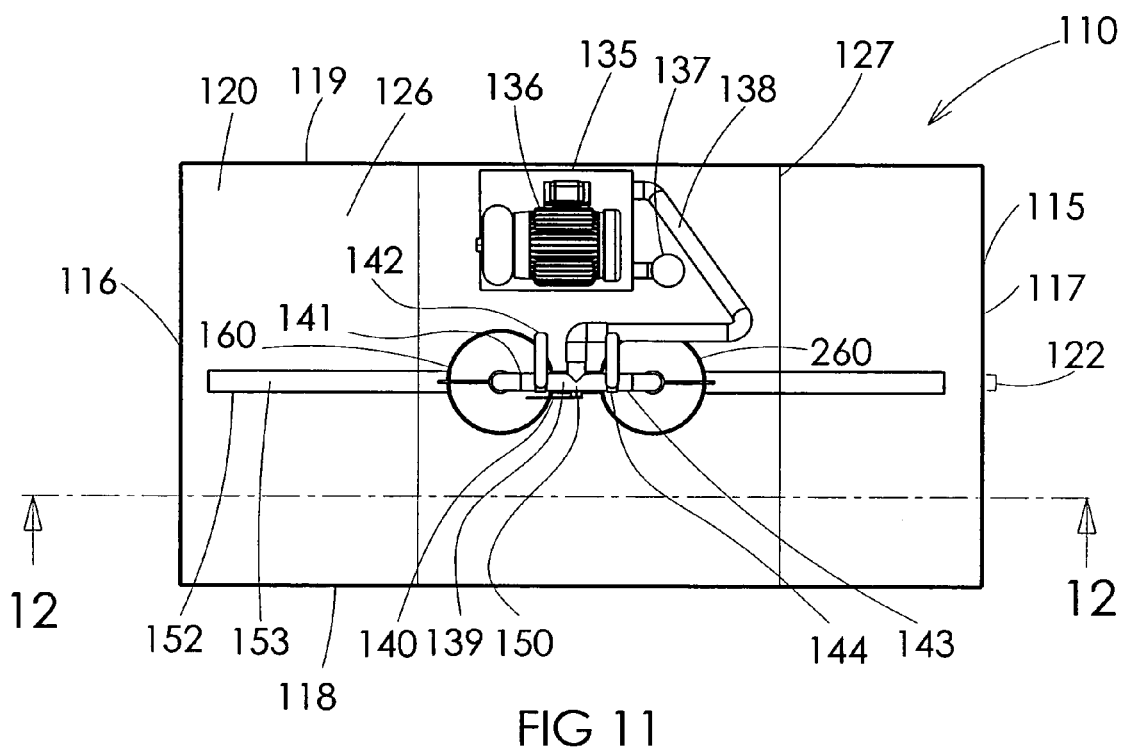
FIG. 11 is a top view of the alternative preferred embodiment shown in FIG. 10.
Figure 12:
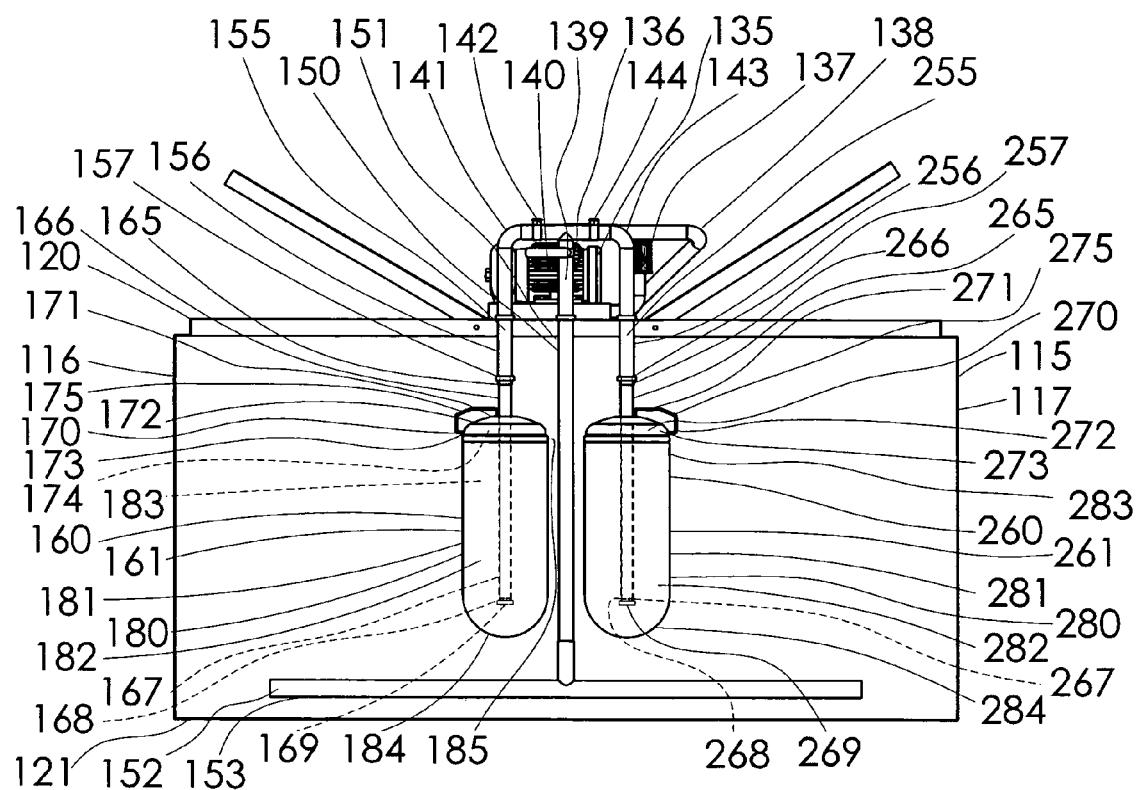
FIG. 12 is a sectional side view of the alternative preferred embodiment shown in FIG. 10 taken along line 12-12.

Turning attention now to a second preferred embodiment of the present invention, an extraction and aeration apparatus 110 is provided. This alternative preferred embodiment is shown in FIGS. 10-12. The apparatus 110 has a tank 115, a fan assembly 135, a base aerator 150, a first extractor head 155, a second extractor head 255, a first extraction assembly 160, and a second extraction assembly 260. These components are described in detail below.

The tank 115 has a first side 116 and an opposed second side 117, and has sides 118 and 119 between the front 116 and rear 117. The tank 115 also has a top 120 and a bottom 121. The sides 116, 117, 118 and 119, and the top 120 and bottom 121 preferably define a generally box shaped tank having a radiused bottom, with interior dimensions approximately 80 inches wide, by 46 inches deep, by 42 inches tall. The bottom of the tank 115 is preferably radiused along a longitudinal axis as shown in FIG. 10. The radiused edges help eliminate havens where harmful microorganisms could otherwise flourish. Tank 115 is preferably supported with supports (not shown) that provide stability to the tank bottom to eliminate rotational movement of the radiused tank bottom. The tank preferably has a volume sufficient to hold at least approximately 500 gallons of liquid 1. It is understood that the shape and particular dimensions of the tank 115 can vary without departing from the broad aspects of the present invention. The tank 115 is preferably made of stainless steel. In the preferred embodiment, an exit orifice 122 is located on the side 117 of the tank 115 near the bottom 121. The orifice 122 is used to drain the contents of the tank 115, and accordingly has a valve used to selectively open and close the orifice. Tank 115 has covers 126 and 127 on the top 120. Covers 126 and 127 are preferably hinged, and can swing upwards as shown in FIG. 10.

The fan assembly 135 preferably is located on top of the tank 115 between the covers 126 and 127. The fan assembly 135 preferably has a fan 136, or blower, and an air filter 137. The fan 136 is preferably capable of moving 60 cfm of air 2. A tube 138 is connected to the fan 136. The tube 138 splits to three tubes 139, 141 and 143. Tube 139 can be selectively opened and closed with valve 140. Tube 141 can be selectively opened and closed with valve 142. Tube 143 can be selectively opened and closed with valve 144. Tubes 139, 141 and 143 can be made with steel or of flexible tubing. Tubes 138 and 139 preferably have a diameter of approximately 2 inches. Tubes 141 and 143 preferably have a diameter of approximately 1.5 inches. While the tubes 138, 139, 141 and 143 are shown to be generally circular in shape, it is understood that the tubes could also be other shapes, such as square.

The base aerator 150 has a depth tube 151 and a lateral base tube 152. The depth tube 151 is preferably substantially vertical, and has a preferred diameter of approximately 2 inches. The lateral base tube 152 is preferably substantially horizontal and located near the bottom 121 of the tank 115 equidistant between the sides 118 and 119 of the tank 115. Base tube 152 preferably has a diameter of approximately 2 inches. The lateral tube 152 has ends that are preferably located equidistant from where the lateral tube 152 connects with the depth tube 151. Several openings 153 are located through the base tube 152 to allow the air to escape into the tank 115. The openings 153 are preferably through the bottom of the tube 152, but could be through other sections of the tube without departing from the broad aspects of the present invention. While the base tube 152 is shown to have a generally circular shape, it is understood that is can also have other shapes. In the illustrated embodiment, the base aerator 150 is integral with tube 139. Base aerator 150 preferably has an aeration rate of approximately 44 cfm. It is understood that the base aerator 150 could have a larger or smaller aeration rate without departing from the broad aspects of the present invention.

The first extractor head 155 is connected to tube 141. The extractor head 155 preferably comprises a generally vertical tube 156. Tube 156 has a top and a bottom. The bottom of the tube 156 preferably has a yoke 157 for removeably connecting to another tube (discussed below). The extractor head 155 preferably has a diameter of approximately 1.5 inches. It is understood that the extractor head 155 could have a different size and shape without departing from the broad aspects of the present invention.

The first extraction assembly 160 defines a container 161. The container 161 has a top portion and a bottom portion. In a preferred embodiment, the container 161 has a volume of four to five gallons. However, the container 161 could be larger or smaller without departing from the broad aspects of the present invention. The container 161 is sized to hold a selected amount of compost 3 or other material. The extraction assembly 160 is removeably connected to the extractor head 155. In this regard, the extraction head 155 holds the extraction assembly 160 in an intended location within the tank 115. The extraction assembly 160 generally comprises an extraction aerator 165, a dome 170 and a filter 180, each of which are described in detail below.

The extraction aerator 165 has a top 166 and a bottom 167. Openings 168 are located near the bottom 167 for allowing air to exit the extraction aerator 165 during use. The extraction aerator 165 is preferably a straight and tubular shaped and has a diameter of approximately 1.5 inches. However, it is understood that the extraction aerator could have other shapes or sizes. The extraction aerator 165 is preferably rigid, and is preferably made of stainless steel. The top 166 of the extraction aerator 165 removeably connects to yoke 157 of the first extractor head 155. An end cap 169 is preferably at the bottom 167 of the extraction aerator 165. The end cap 169 can be removed from the bottom 167 to allow for cleaning of the extraction aerator 165. Extractor aerator 165 preferably has an aeration rate of approximately 8 cfm. However, it is understood that the aeration rate could be greater or smaller without departing from the broad aspects of the present invention.

The dome 170 has a top 171 and a sidewall 172. The sidewall 172 has a top and a bottom. The top 171 and sidewall 172 have an interior surface and an exterior surface. A lip 173 preferably surrounds the sidewall 172 at the bottom exterior surface of the sidewall. The interior of the dome 170 defines an interior region 174, or simply region. A handle 175 can optionally be connected to the outside surface of the dome. The dome is preferably made of stainless steel. In the illustrated embodiment, the extraction aerator 165 passes through the center of the dome 160. It is understood that the extraction aerator 165 could extend around the outside of the dome without departing from the broad aspects of the present invention. While the dome shape has been found to be a preferred shape, other shapes are possible.

A preferred filter 180 is a mesh bag 181. The mesh bag 181 has openings 182 preferably sized approximately 400 microns. However, the openings 182 could be between about 250 and 841 microns (20 to 60 mesh) without departing from the broad aspects of the present invention. The mesh bag 181 further has a top 183 and a bottom 184, an interior surface and an exterior surface. The bag 181 preferably has an interior capacity of approximately 4 gallons. A clamp 185 is preferably located at the top 183 of the bag 181. The clamp 185 can be a band clamp, and it is used to removeably secure the bag 181 to the dome 170 by tightening onto the exterior surface of the dome 170 above the lip 173. The extraction aerator 165 preferably extends to near the bottom 184 of the bag 180, and passes through the interior of the bag. Alternatively, a rigid filter such as a wire mesh cage could be used without departing from the broad aspects of the present invention. Further alternatively, the extraction aerator could pass around the exterior of the filter 180 and have an opening at the bottom 184 of the filter. The filter 180 can be a single-use filter or a reusable filter.

The second extractor head 255 is connected to tube 143. The extractor head 255 preferably comprises a generally vertical tube 256. Tube 256 has a top and a bottom. The bottom of the tube 256 preferably has a yoke 257 for removeably connecting to another tube (discussed below). The extractor head 255 preferably has a diameter of approximately 1.5 inches. It is understood that the extractor head 255 could have a different size and shape without departing from the broad aspects of the present invention.

The second extraction assembly 260 defines a container 261. The container 261 has a top portion and a bottom portion. In a preferred embodiment, the container 261 has a volume of four to five gallons. However, the container 261 could be larger or smaller without departing from the broad aspects of the present invention. The container 261 is sized to hold a selected amount of compost 3 or other material. The extraction assembly 260 is removeably connected to the extractor head 255. In this regard, the extraction head 255 holds the extraction assembly 260 in an intended location within the tank 115. The extraction assembly 260 generally comprises an extraction aerator 265, a dome 270 and a filter 280, each of which are described in detail below.

The extraction aerator 265 has a top 266 and a bottom 267. Openings 268 are located near the bottom 267 for allowing air to exit the extraction aerator 265 during use. The extraction aerator 265 is preferably a straight and tubular shaped and has a diameter of approximately 1.5 inches. However, it is understood that the extraction aerator could have other shapes or sizes. The extraction aerator 265 is preferably rigid, and is preferably made of stainless steel. The top 266 of the extraction aerator 265 removeably connects to yoke 257 of the second extractor head 255. An end cap 269 is preferably at the bottom 267 of the extraction aerator 265. The end cap 269 can be removed from the bottom 267 to allow for cleaning of the extraction aerator 265. Extractor aerator 265 preferably has an aeration rate of approximately 8 cfm. However, it is understood that the aeration rate could be greater or smaller without departing from the broad aspects of the present invention.

The dome 270 has a top 271 and a sidewall 272. The sidewall 272 has a top and a bottom. The top 271 and sidewall 272 have an interior surface and an exterior surface. A lip 273 preferably surrounds the sidewall 272 at the bottom exterior surface of the sidewall. The interior of the dome 270 defines an interior region 274, or simply region. A handle 275 can optionally be connected to the outside surface of the dome. The dome is preferably made of stainless steel. In the illustrated embodiment, the extraction aerator 265 passes through the center of the dome 260. It is understood that the extraction aerator 265 could extend around the outside of the dome without departing from the broad aspects of the present invention. While the dome shape has been found to be a preferred shape, other shapes are possible.

A preferred filter 280 is a mesh bag 281. The mesh bag 281 has openings 282 preferably sized approximately 400 microns. However, the openings 282 could be between about 250 and 841 microns (20 to 60 mesh) without departing from the broad aspects of the present invention. The mesh bag 281 further has a top 283 and a bottom 284, an interior surface and an exterior surface. The bag 281 preferably has an interior capacity of approximately 4 gallons. A clamp 285 is preferably located at the top 283 of the bag 281. The clamp 285 can be a band clamp, and it is used to removeably secure the bag 281 to the dome 270 by tightening onto the exterior surface of the dome 270 above the lip 273. The extraction aerator 265 preferably extends to near the bottom 284 of the bag 280, and passes through the interior of the bag. Alternatively, a rigid filter such as a wire mesh cage could be used without departing from the broad aspects of the present invention. Further alternatively, the extraction aerator could pass around the exterior of the filter 280 and have an opening at the bottom 284 of the filter. The filter 280 can be a single-use filter or a reusable filter.

Turning to the operation of the illustrated alternative embodiment of the present invention, selected amount of water (preferably approximately 500 gallons) can be inserted into the tank 115. A selected amount of compost (preferably approximately 2 gallons, or 8 liters) can be placed on the inside of each filter 180 and 280. Filter 180 can then be clamped onto the dome 170 by securing the band clamp 185 onto the exterior surface of the dome 170 above the lip 173. Filter 280 can then be clamped onto the dome 270 by securing the band clamp 285 onto the exterior surface of the dome 270 above the lip 273. Next, extraction assemblies 160 and 260 can be put in place within the tank 115. This is preferably accomplished by the user holding onto the handle 175 and connecting the top 166 of the extraction aerator 165 to the yoke 157 of the extractor head 155, and by holding onto the handle 275 and connecting the top 266 of the extraction aerator 265 to the yoke 257 of the extractor head 255. Since the extraction aerators 165 and 265 and the extraction heads 155 and 255 are rigid components, the extraction assemblies 160 and 260 are secured in their respective selected locations within the tank 115. In the preferred location, at least the lips 173 and 273 at the bottom of the domes 170 and 270, respectively, are submerged within the liquid in the tank 115. The entire domes 170 and 270 can be submerged in the liquid.

With the extraction assemblies 165 and 265 secured in place within the tank 115, the blower 136 can be activated. The blower 136 draws in filtered air 2 through the air filter 137 and moves the air 2 to tube 138. Tube 138 splits into three tubes; tube 139 for the base aerator 150 tube 141 for the first extractor head 155, and tube 143 for the second extractor head 255. Valve 140 can be opened to allow air 2 to exit the holes 153 in the lateral tube 152 of the base aerator 150 at the bottom 121 of the tank 115. Valve 142 can be opened to allow air 2 to enter the first extraction aerator 165. The air 2 in the extraction aerator 165 exits into the filter 180 by exiting holes 168 near the bottom 167 of the extraction aerator 165. Valve 144 can be opened to allow air 2 to enter the second extraction aerator 265. The air 2 in the extraction aerator 265 exits into the filter 280 by exiting holes 268 near the bottom 267 of the extraction aerator 265.

Air 2 entering the first extraction assembly 160 mixes with the compost 3 and liquid 1 in the filter 180 as the air rises through the filter. Some of the compost 3 rises with the air into the region 174 defined by the dome 170. Vigorous mixing occurs in the dome 170. Bidirectional movement of the air causes the vigorous jostling. That is, the air 2, being less dense than the liquid 1, tends to rise in the liquid. However, the dome captures the rising air and causes the air to redirect downward so that it can exit the extraction assembly 160 through the filter 180. The vigorous mixing accelerates the separation of the microorganisms 5 from the larger particles 4 in the compost 3.

Generally, approximately the same amount of air that enters the extraction assembly 160 must also exit the extraction assembly in a given amount of time. The only way for the air 2 to exit the extraction assembly 160 is through the filter 180. Air 2 leaving the filter 180 causes a current, or flow, of air 2, liquid 1 and small particles to exit the filter 180 through the holes 182 at or near the top 183 of the filter. Liquid can be drawn into the filter 180 near the bottom 184 of the filter to replenish the liquid exiting the filter 180 near the top 183. This contributes to the mixing of the liquid 1, air 2, and compost 3 in the extraction assembly 160. The natural tendency of the air 2 to continually rise in the liquid 1 causes the air to enter the region 174 of the dome 170 for vigorous bidirectional mixing.

Air 2 entering the second extraction assembly 260 mixes with the compost 3 and liquid 1 in the filter 280 as the air rises through the filter. Some of the compost 3 rises with the air into the region 274 defined by the dome 270. Vigorous mixing occurs in the dome 270. Bidirectional movement of the air causes the vigorous jostling. That is, the air 2, being less dense than the liquid 1, tends to rise in the liquid. However, the dome captures the rising air and causes the air to redirect downward so that it can exit the extraction assembly 260 through the filter 280. The vigorous mixing accelerates the separation of the microorganisms 5 from the larger particles 4 in the compost 3.

Generally, approximately the same amount of air that enters the extraction assembly 260 must also exit the extraction assembly in a given amount of time. The only way for the air 2 to exit the extraction assembly 260 is through the filter 280. Air 2 leaving the filter 280 causes a current, or flow, of air 2, liquid 1 and small particles to exit the filter 280 through the holes 282 at or near the top 283 of the filter. Liquid can be drawn into the filter 280 near the bottom 284 of the filter to replenish the liquid exiting the filter 280 near the top 283. This contributes to the mixing of the liquid 1, air 2, and compost 3 in the extraction assembly 260. The natural tendency of the air 2 to continually rise in the liquid 1 causes the air to enter the region 274 of the dome 270 for vigorous bidirectional mixing.

The microorganisms 5 that are extracted from the extraction assemblies 160 and 260 can aerobically grow and multiply in the aerated tank 115. Selected types and amounts of microbial food can be added to the tank 115 to aid in this growth. It is noteworthy that large particles remain in the extraction assemblies 160 and 260 and are incapable of passing through the respective filters 180 and 280. It has been found beneficial to run the extraction process for approximately 20-24 hours to achieve a solution having high numbers of microorganisms. After that point, valves 142 and 144 can be closed and the extraction assemblies 160 and 260 can be removed. The extraction assemblies 160 and 260 is removed by disconnecting the extraction aerators 165 and 265 from the yokes 157 and 257 of the respective extraction heads 155 and 255, and using the handles 175 and 275 to lift the respective extraction assemblies 160 and 260 from the tank 115. The tea can be kept in the tank 115 for approximately four days so long as the fan 136 stays on and valve 140 stays open. The tea can be drained from the tank 115 through orifice 122.

Thus it is apparent that there has been provided, in accordance with the invention, an aeration and extraction assembly and a method of extracting and growing compost tea that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An aeration assembly comprising:
   a tank for holding a predetermined amount of liquid;
   a blower;
   an extractor head connected to said blower; and an extraction assembly having a top portion, a bottom portion, and a extraction aerator connectable to said extractor head and extending to said bottom portion and opening into said bottom portion, said top portion defining a mixing region, and said bottom portion being submergible in the predetermined amount of liquid and having a filter with holes sized approximately 250 to 841 microns, wherein a selected amount of contents having particle sizes larger and smaller than the size of said holes of said filter is contained in said bottom portion, wherein said blower causes air to exit said extraction aerator in said bottom portion of said extraction assembly causing the contents, the liquid and air to mix in said bottom portion and vigorously mix in said top portion, and wherein the air exiting said filter forms a current causing some of the liquid and particles having a size smaller than the size of said holes to exit said extraction assembly through said filter.

2. The aeration assembly of claim 1 wherein said top portion has a dome, and said filter is a mesh bag that is removeably connected to said dome.

3. The aeration assembly of claim 2 wherein said dome has a lip, and said mesh bag is clamped onto said dome above said lip.

4. The aeration assembly of claim 2 wherein said extraction aerator extends through said dome to said bottom portion of said extraction assembly.

5. The aeration assembly of claim 1 further comprising a base aerator for aerating the liquid in said tank.

6. The aeration assembly of claim 1 wherein said extractor head has a yoke, and said extraction aerator has a top, wherein said top of said extraction aerator is removeably connected to said yoke of said extractor head.

7. The aeration assembly of claim 1 wherein said tank has a volume of about 250 gallons, said extraction assembly has a volume of about 4 gallons, and said extraction aerator has an aeration rate of about 8 cubic feet of air per minute.

8. An aeration and extraction assembly comprising:
a tank for holding a selected amount of liquid;
a blower for moving air at a selected rate;
an extractor head having a first end connected to said blower and a second end;
a dome having a bottom and a top, said bottom being submergible in the liquid, and said dome defining an interior region between said bottom and said top;
a filter having openings of a selected size, said filter being connectable to said dome, said filter further being capable of holding a selected amount of material with particles being greater and smaller in size than the size of said openings; and
an extraction aerator connected to said second end of said extractor head and opening into said filter,
wherein said extraction aerator, said dome and said filter define a container open to said tank only through said openings of said filter, and
wherein the air entering said filter causes the material, liquid and air to vigorously mix in said interior region of said dome, and the air exiting said filter through said holes creates a current causing the particles smaller in size than said openings to exit said filter through said openings.

9. The aeration and extraction assembly of claim 8 wherein said tank has a bottom, and said aeration and extraction assembly further comprises a base aerator connected to said blower and open at said bottom of said tank.

10. The aeration and extraction assembly of claim 8 wherein said second end of said extractor head has a yoke, and said extraction aerator is removeably connected to said yoke.

11. The aeration and extraction assembly of claim 8 wherein said filter comprises a bag having holes approximately between 250 and 841 microns.

12. The aeration and extraction assembly of claim 11 wherein:
said dome has a lip at said bottom of said dome; and
said bag has a top and a bottom, said top having a band clamp connected thereto,
wherein said bag is removeably connected to said dome by securing said band clamp of said bag over said lip of said dome.

13. The aeration and extraction assembly of claim 12 wherein said extraction aerator has openings that are located near said bottom of said bag.

14. The aeration and extraction assembly of claim 8 wherein said tank has a volume of about 250 gallons, said extraction assembly has a volume of about 4 gallons, and said extraction aerator has an aeration rate of about 8 cubic feet of air per minute.

15. A method of producing compost tea comprising the steps of:
providing a tank having a blower, a base aerator, an extractor head, and an extraction assembly, the extraction assembly having a dome with a top, bottom and a region between the top and bottom of the dome, the extraction assembly further having a extraction aerator and a filter;
providing enough liquid to fill the tank to a selected level and filling the tank to the selected level with the liquid;
providing compost containing microorganisms, and placing a selected amount of the compost into the filter;
connecting the extraction aerator to the extractor head so that the filter and at least the bottom of the dome is submerged in the liquid; and
having the blower cause air to exit the base aerator to aerate the tank and exit the extraction aerator to enter the extraction assembly,
wherein the air entering the extraction assembly mixes with the liquid and compost in the filter, and vigorously mix with the liquid and compost in the region of the dome to separate microorganisms in the compost from the remainder of the compost, and
wherein the air exiting the filter causes some of the microorganisms to exit the filter.

16. The method of producing compost tea of claim 15 wherein the step of providing a filter comprises the step of providing a filter with a bottom and a top, and the step of having the blower cause air to exit the extraction aerator comprises the step of having the blower cause air to exit the extraction aerator near the bottom of the filter.

17. The method of producing compost tea of claim 15 wherein:
the step of providing a dome comprises the step of providing a dome with a lip on the bottom of the dome; and
the step of providing a filter comprises the step of providing a filter with a band clamp at the top of the filter for removeably securing the filter to the dome above the lip.

18. The method of producing compost tea of claim 15 wherein the step of providing a filter comprises the step of providing a bag with holes sized between approximately 250 and 841 microns.

19. The method of producing compost tea of claim 15 further comprising the step of providing an extraction aerator passing through the dome and being centrally located within the filter.

20. The method of producing compost tea of claim 15 wherein:

the step of providing enough liquid to fill the tank to a selected level comprises the step of providing approximately 250 gallons of liquid; and the step of having the blower cause air to exit the base aerator to aerate the tank and exit the extraction aerator to enter the extraction assembly comprises the step of aerating the tank through the base aerator at a rate of approximately 22 cfm and aerating the extraction assembly through the extraction assembly at a rate of approximately 8 cfm.

* * * * *